(12) United States Patent
Keenan (10) Patent No.: US 12,330,548 B2
(45) Date of Patent: Jun. 17, 2025

(54) DUNNAGE BAG WITH GRADUATED INFLATION STRIPES

(71) Applicant: AtMet Group, Inc., Norcross, GA (US)

(72) Inventor: Thomas Keenan, Norcross, GA (US)

(73) Assignee: AtMet Group, Inc., Norcross, GA (US)

( * ) Notice: Subject to any disclaimer, the term of this patent is extended or adjusted under 35 U.S.C. 154(b) by 601 days.

(21) Appl. No.: 17/827,199

(22) Filed: May 27, 2022

(65) Prior Publication Data
US 2022/0379797 A1  Dec. 1, 2022

Related U.S. Application Data

(60) Provisional application No. 63/194,775, filed on May 28, 2021.

(51) Int. Cl.
*B60P 7/06* (2006.01)
(52) U.S. Cl.
CPC .................... *B60P 7/065* (2013.01)
(58) Field of Classification Search
CPC .......... B60P 7/06; B60P 7/065; B65D 5/4212; B65D 2203/00; B65D 2203/12
USPC ............................. 206/459.5, 459.1
See application file for complete search history.

(56) References Cited

U.S. PATENT DOCUMENTS

| | | | | |
|---|---|---|---|---|
| 5,454,407 A * | 10/1995 | Huza | ...................... | B60P 7/065 |
| | | | | 141/10 |
| 6,561,236 B1 * | 5/2003 | Sperry | .................... | B05B 1/005 |
| | | | | 141/114 |
| 2012/0261293 A1 * | 10/2012 | Villarrubia | ......... | B65D 33/2508 |
| | | | | 206/524.6 |
| 2016/0039574 A1 * | 2/2016 | Barlas | .................... | B65D 27/06 |
| | | | | 206/459.5 |
| 2022/0379797 A1 * | 12/2022 | Keenan | .................... | B60P 7/065 |
| 2023/0242032 A1 * | 8/2023 | Keenan | ................ | F16K 15/063 |
| | | | | 410/119 |

\* cited by examiner

*Primary Examiner* — Jacob K Ackun
(74) *Attorney, Agent, or Firm* — Ryan J. Letson; Alex Huffstutter; Bradley Arant Boult Cummings LLP (57) ABSTRACT

A dunnage bag may have stripes on its sides that extend from a top edge to a bottom edge of the bag. When the bag is inflated, one or more of the stripes may be visible to a user viewing an end of the bag. A number and width of stripes visible to a user may indicate a width of the dunnage bag, a corresponding width of the gap within which the bag is positioned, and an amount the bag that is in contact with surfaces of adjacent cargo. The user may note an outermost visible and determine that the bag has a width within a range of widths associated with such outermost visible stripe, and whether such width allows for the bag to be used safely. If a stop stripe is visible, the gap is too wide for the bag.

12 Claims, 9 Drawing Sheets

DUNNAGE BAG WITH GRADUATED INFLATION STRIPES

CROSS REFERENCE TO RELATED APPLICATIONS

This application claims the benefit of and priority to U.S. Provisional Patent Application Ser. No. 63/194,775, entitled "Dunnage Bag with Graduated Inflation Stripes," and filed on May 28, 2021, which is incorporated herein by reference in its entirety.

RELATED ART

Inflatable air bags, called "dunnage bags" are frequently used to support or stabilize cargo loads. Such bags are often used to stabilize cargo containers and other items within transport vehicles. This helps prevent cargo from shifting and becoming damaged during the shipping and handling thereof due to the existence or presence of spaces or voids between the cargo.

When using dunnage bags in connection with the support or stabilization of cargo loads, the air bag is positioned between two adjacent loads, for example, in a deflated condition and is subsequently inflated using pressurized air conducted into the air bag bladder through an air inlet valve. When properly inflated, the voids or spaces defined between the loads are properly filled, the loads are properly supported and stabilized, and safe and reliable transportation of the loads can commence.

A dunnage bag's internal inflation pressure may be specified by regulation, which may provide an acceptable pressure or range of acceptable pressures for the dunnage bag based on cargo type. When a dunnage bag is inflated to an acceptable pressure between cargo, it is important that an appropriate amount of surface areas of the inflated dunnage bag is in contact with surfaces of the dunnage bag. Proper stabilization of cargo requires use of a bag with appropriate proportions so that the desired surface area of the bag is in contact with surfaces of the cargo within the gap between cargo and at the specified pressure for that cargo type.

Users must select a dunnage bag size for a particular gap and cargo type. It is often difficult for users to correctly identify an appropriate size to use for a particular gap and cargo type. If a lateral void ("gap" herein) between cargo is too large for the bag, this may reduce contact between bag and cargo. This may reduce ability of the bag to restrain or stabilize the cargo.

Techniques for providing visual indicators on air bag are described in U.S. Pat. No. 5,678,969, filed Oct. 21, 1997 and entitled "Air Bag Having Inflation Indicator And Method of Determining Proper Spacing Between Loads Supported Thereby" and filed Sep. 1, 1995 and U.S. Pat. No. 5,730,564, filed Jul. 24, 1996 and entitled "Cargo Load Supporting Air Bag Having Inflation Indicating Means And Method of Determining Proper Inflation for Spaced Loads" and filed Jul. 24, 1996. Each of the foregoing is hereby incorporated by reference herein in its entirety. These prior applications involve printing of indicators and defining an acceptable range of inflation pressures using a single marking line on a side of the bag. These techniques are expensive and offer limited information to users. They also do not clearly convey information to users, independent of the user's language, about the bag, and width of the gap within which the bag is being used. Because the bags are used internationally with multi-language users Improved techniques for visually or intuitively indicating such information to users are generally desirable.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

A. Definitions

Unless otherwise defined, all terms (including technical and scientific terms) used herein have the same meaning as commonly understood by one of ordinary skill in the art of this disclosure. It will be further understood that terms, such as those defined in commonly used dictionaries, should be interpreted as having a meaning that is consistent with their meaning in the context of the specification and should not be interpreted in an idealized or overly formal sense unless expressly so defined herein. Well known functions or constructions may not be described in detail for brevity or clarity.

The terms "about" and "approximately" shall generally mean an acceptable degree of error or variation for the quantity measured given the nature or precision of the measurements. Typical, exemplary degrees of error or variation are within 20 percent (%), preferably within 10%, and more preferably within 5% of a given value or range of values. Numerical quantities given in this description are approximate unless stated otherwise, meaning that the term "about" or "approximately" can be inferred when not expressly stated.

It will be understood that when a feature or element is referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments.

The terminology used herein is for the purpose of describing particular embodiments only and is not intended to be limiting. As used herein, the singular forms "a", "an" and "the" are intended to include the plural forms as well, unless the context clearly indicates otherwise.

Spatially relative terms, such as "under", "below", "lower", "over", "upper" and the like, may be used herein for ease of description to describe one element or feature's relationship to another when the apparatus is right side up.

The terms "first", "second", and the like are used herein to describe various features or elements, but these features or elements should not be limited by these terms. These terms are only used to distinguish one feature or element from another feature or element. Thus, a first feature or element discussed below could be termed a second feature or element, and similarly, a second feature or element discussed below could be termed a first feature or element without departing from the teachings of the present disclosure.

Terms such as "at least one of A and B" should be understood to mean "only A, only B, or both A and B." The same construction should be applied to longer list (e.g., "at least one of A, B, and C").

The term "consisting essentially of" means that, in addition to the recited elements, what is claimed may also contain other elements (steps, structures, ingredients, components, etc.) that do not adversely affect the operability of what is claimed for its intended purpose as stated in this disclosure. Importantly, this term excludes such other elements that adversely affect the operability of what is claimed for its intended purpose as stated in this disclosure, even if such other elements might enhance the operability of what is claimed for some other purpose.

In some places reference is made to standard methods, such as but not limited to methods of measurement. It is to be understood that such standards are revised from time to time, and unless explicitly stated otherwise reference to such standard in this disclosure must be interpreted to refer to the most recent published standard as of the time of filing.

B. Dunnage Bag with Graduated Inflation Stripes

This disclosure generally pertains to some embodiments of a dunnage bag with graduated inflation stripes. A dunnage bag may be positioned in a gap between cargo objects and inflated to stabilize the cargo during transit. The dunnage bag may have stripes on its sides that extend from a top edge to a bottom edge of the bag. When the bag is inflated, one or more of the stripes may be visible to a user viewing an end of the bag. A number, width and appearance of stripes visible to a user may indicate a width of the gap within which the bag is positioned, whether the bag is and an amount the bag that is in contact with surfaces of adjacent cargo. The user may note an outermost visible stripe and based on an appearance of the stripe, determine that the bag has a width within a range of widths associated with such outermost visible stripe, and whether such width allows for the bag to be used safely for bracing cargo.

If a gap is too wide for a bag of a certain size, insufficient surface area of the bag may be in contact with surfaces of the adjacent cargo when the bag is inflated. As a result, force may be insufficiently distributed over bag surfaces. Forces may be too concentrated per unit area of portions of the bag that are in contact with the cargo. Such excess forces on a given area of the bag may exceed a rating for the bag, eventually resulting in bag failure or rupture.

A "width" of the bag may refer to the horizontal width of the bag when positioned in a lateral void or gap between cargo (e.g., a width of the bag across its minor axis, perpendicular to planes defined by surfaces of cargo the bag is bracing). As an example, with reference to FIG. 4, a width of the bag 5 may be a distance from one side of the bag to another when measured along a line extending essentially perpendicularly between planes defined by surfaces of cargo 40, 42 that the bag 5 is bracing. Note that this is essentially the same distance as gap 44. In some embodiments, as described further below, a user may note visible stripes on the bag and thereby determine a width the bag and, corresponding width of the gap in which a dunnage bag is inserted.

Figure 1:
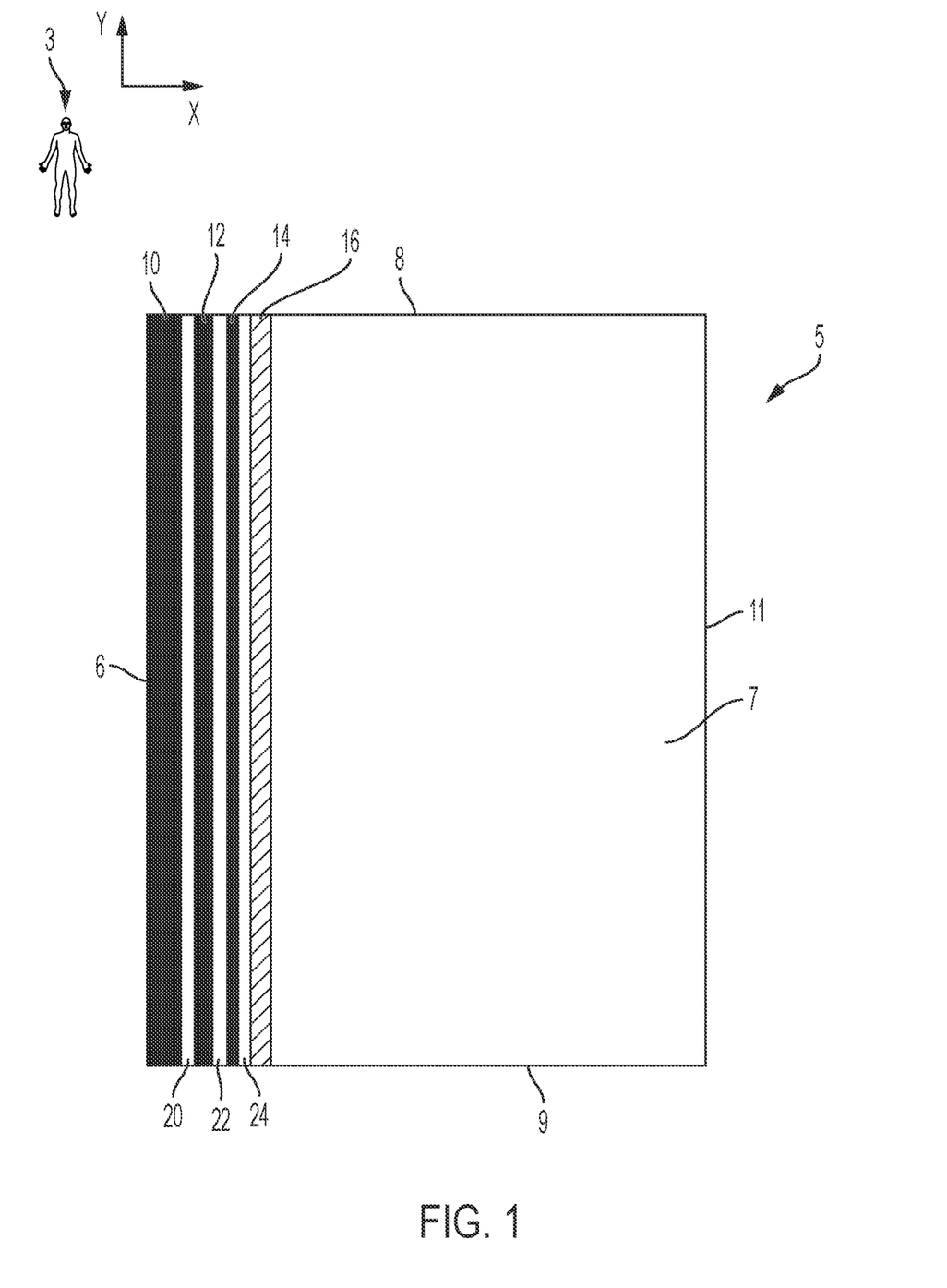
FIG. 1 is a side view of a deflated dunnage bag with graduated inflation stripes in accordance with some embodiments of the present disclosure.

FIG. 1 is a side view of a dunnage bag 5 with graduated inflation stripes in accordance with some embodiments of the present disclosure. The bag 5 has various numbers and types of graduated inflation stripes in some embodiments. In the embodiment of FIG. 1, the bag has a side 7, which features inflation stripes 10, 12, 14 and 16. Each of stripes 10-16 may have an appearance that indicates a range of widths of the bag depending on which stripes are visible to a user. A user may determine a bag width based on an appearance of an outermost stripe that is visible to the user when the bag is inflated (e.g., outermost in the Z-axis direction of FIG. 3). The stripes may also indicate a range of widths of a gap into which the bag 5 is inserted, as well as a surface area of the bag 5 that is in contact with surfaces of the adjacent cargo 40, 42 (FIGS. 4-8). Stripes 10-16 on bag 5 may have an appearance that indicates other aspects of the bag in other embodiments, and other numbers and types of stripes are possible in other embodiments.

The stripes 10-16 may extend essentially uninterrupted (e.g., continuously) and essentially parallel to one another between a top seam 8 of the bag 5 and a bottom seam of the bag 9 (that is, essentially in the direction of the Y-axis in FIG. 1). In some embodiments, the stripes 10-16 may have intermittent gaps between them, and may have features (e.g., symbols, octagonal stop sign, warnings, lettering and wording, etc.) which may convey information to a user. The stripes may allow information about bag width and safe usage to be indicated visually to a user independent of language spoken by the user (e.g., using universally-recognizable warning symbols, coloring, etc.). In some embodiments, such information may comprise markings indicating a length of a stripe, distance measurements from an edge 8, 9, height or size of the bag, etc. In some embodiments, one or more of stripes 10-16 may be essentially continuous while one or more other stripes may not be.

Appearances of stripes 10-14 may indicate ranges of widths of bag 5 (e.g., a width of the bag when positioned in a gap between cargo, where the bag is being used) when the bag 5 is inflated (as seen in FIGS. 3-8). As used herein, the term "safe inflation width" for the bag 5 may refer to a range of widths to which the bag 5 may be inflated without exceeding an approximate maximum width at which the bag may be safely used (e.g., within a margin of safety for which the bag is designed or with reference to applicable regulations for dunnage bags, such as the Association of American Railroads Product Performance Profile for Pneumatic Dunnage, effective Jul. 1, 2005 and as revised and supplemented from time to time,—and which is hereby incorporated by reference). In some embodiments, a specified approximate maximum width for a gap between cargo may be approximately 12 inches, such as when cargo is carried via railroad vehicle. In some embodiments, an approximate maximum gap width may be based on accepted industry norms or practices, such as maritime cargo securement practices (where an approximate maximum is 12 inches). In some embodiments, a specified maximum permissible gap width may be limited by an experientially-determined safe inflation width of the dunnage bag, such as when transportation occurs via a transportation method (e.g., ground vehicle) for which cargo securement is not subject to regulation. In some embodiments the appearances of the stripes may indicate whether gap width is within maximum 12" width specified by AAR regulation (above).

In some embodiments, inflation stripe 10 may have a width of approximately 55 millimeters (mm) and may indicate a range of bag widths between approximately 3 inches when a first edge of the stripe 10 is visible (an edge of stripe 10 adjacent to edge 6) and 6 inches when a second edge of the stripe 10 is visible (an edge of stripe 10 adjacent to region 20); inflation stripe 12 may have a width of approximately 35 mm and may indicate a range of bag widths between approximately 7 inches when a first edge of the stripe 12 is visible (an edge of stripe 12 adjacent to region 20) and 8.75 inches when a second edge of the stripe 12 is visible (an edge of stripe 12 adjacent to region 22); inflation stripe 14 may have a width of approximately 20 mm and may indicate a range of bag widths between approximately 9.75 inches when a first edge of the stripe 14 is visible (an edge of stripe 14 adjacent to region 22) and 11 inches when a second edge of the stripe 14 is visible (an edge of stripe 14 adjacent to region 24). A bag 5 may have additional stripes associated with additional ranges of widths in some embodiments. Other widths of one or more stripes are possible, and it is to be understood that the values and ranges herein are merely exemplary.

There may be distinct gaps or regions between inflation stripes in order to aid in legibility. The bag 5 of FIG. 1 has three regions: region 20, which may have a width of approximately 20 mm and may indicate a range of bag widths between approximately 6 inches when a first edge of the region 20 is visible (an edge of region 20 adjacent to stripe 10) and 7 inches when a second edge of the region 20 is visible (an edge of region 20 adjacent to stripe 12); region 22, which may have a width of approximately 20 mm and may indicate a range of bag widths between approximately 8.75 inches when a first edge of the region 22 is visible (an edge of region 22 adjacent to stripe 12) and 9.75 inches when a second edge of the region 22 is visible (an edge of region 22 adjacent to stripe 14); and region 24, which may have a width of approximately 20 mm and may indicate a range of bag widths between approximately 11 inches when a first edge of the region 24 is visible (an edge of region 24 adjacent to stripe 14) and 12 inches when a second edge of the region 24 is visible (an edge of region 204 adjacent to stripe 16). In some embodiments, such regions may have a different appearance than one or more of the stripes 10-16, such as a different texture or color. In some embodiments, the regions 20-24 may have the same color as bag 5, but in some embodiments, they may be varying shades of color indicating to a user that bag width is increasing toward an unsafe bag width. The bag 5 may have additional regions associated with other ranges of pressures in other embodiments. Other widths of one or more gaps are possible, and it is to be understood that the values and ranges herein are merely exemplary.

Stripe 16 may indicate a range of unsafe bag widths when visible. Stripe 16 may be referred to as a "stop" stripe, "danger" stripe or similar. "Unsafe bag width" may refer to a range of widths that exceeds an approximate maximum width at which the bag may be used safely (e.g., because a safety factor of the bag is decreased to an unacceptable degree, because a force concentration exceeds a maximum for the bag, because a gap width specified by an applicable regulation is exceeded, etc.). Stop stripe 16 may have a width of approximately 30 mm and may indicate a range of bag widths between approximately 12 inches when a first edge of the stripe 16 is visible (an edge of stripe 16 adjacent to region 24) and 14 inches when a second edge of the region 24 is visible (an edge of stripe 16 adjacent to region 80 in FIG. 8). Further, if a portion of the bag 5 beyond stripe 16 (e.g., in the Y-axis direction) is visible, such may indicate a bag width exceeding approximately 14 inches. Other widths and ranges are possible in other embodiments.

Note that the stripes 10-16 may have appearances and features indicating to a user a remaining safe inflation width for the bag 5.

In some embodiments, width of a stripe may indicate remaining safe inflation width. A stripe width may vary to designate its position within stripe ordering (innermost to outermost or vice versa). For example, in the embodiment of the figures, stripe width may decrease in width from innermost stripe (stripe 10) to outermost stripe (stripe 16) when viewed from an end of the bag as in FIG. 4. This may indicate to a user 3 a remaining safe width for the bag 5, or how close a current width of the bag 5 is to an approximate maximum width for the bag 5. In some embodiments, the stripes 10-16 may be associated with visible numbers indicating how many additional inflation stripes remain until the stop stripe 16 is visible.

In some embodiments, stripe symbols, numbering or lettering may be used to indicate remaining safe inflation width. In some embodiments, the stripes 10-16 may have a symbol, numbering or lettering designating its position within stripe ordering (innermost to outermost or vice versa). For example, numbers associated with stripes may decrease in number from innermost stripe to outermost stripe. For example, if there are 3 safe inflation stripes 10, 12 and 14, each may be given a number, descending in value inward to outward. Innermost stripe 10 may be labeled "2"; adjacent stripe 12 may be labeled "1"; adjacent stripe 14 may be labeled "0". The stop stripe 16 may have a stop symbol.

In some embodiments, stripe coloring may indicate remaining safe inflation width. In some embodiments, the stripes 10-16 have a color designating its position within stripe ordering (from innermost stripe to outermost stripe. For example, if there are 3 safe inflation stripes 10, 12 and 14, each may be assigned a color, which may change from stripe to stripe. In some embodiments, the stripes may be given a "stop light" color scheme from innermost stripe (green) to middle stripes (yellow/orange) to outermost stop stripe (red). Innermost stripe 10 may be colored green; adjacent stripe 12 may be colored yellow; adjacent stripe 14 may be colored orange. The stop stripe 16 may be colored red in some embodiments.

One or more or various combinations of stripe width, symbols, numbering, lettering, or colors maybe used to indicate position of a stripe relative to safe inflation width for the bag in some embodiments.

As an example of operation of the bag 5 and stripes 10-16, the bag 5 may be inserted into a gap between cargo and inflated (e.g., FIGS. 3 and 4-8). The bag 5 may be visible to a user 3 (such as a dock worker or other person tasked with monitoring safe usage of the bag 5) from an end 6 of the bag (e.g., when a user is viewing the bag in the positive X-direction, such as the perspective shown in FIGS. 4-8). In this regard, the stripes 10-16 may indicate a width of the bag 5 (and thus, of the gap into which it is inserted), and an amount of the dunnage bag 5 that is in contact with surfaces of adjacent cargo 40, 42. Additional stripes on bag 5 (e.g., 14-16) may be visible to the user, and each may be ranges of widths may be associated with subsequent increments or ranges of bag widths.

End 11 may be positioned away from the viewer, such as between end 6 and a wall of a container holding the bag 5 and cargo 40, 42. While FIG. 1 shows a side view of the bag 5, an exemplary position and viewing perspective of a user 3, along with X and Y axes, also are included for reference. Additional exemplary views as seen from the perspective of a user 3 when a bag 5 is inflated and positioned between objects 40, 42 are provided in FIGS. 4-8 and discussed further below.

After the bag 5 is positioned between cargo 40, 42 and inflated, a user 3 may observe the number and width of stripes visible on the bag to determine an approximate corresponding width of the bag and whether the width is safe. If a first, innermost stripe (e.g., stripe 10) is visible, this may indicate that the bag has a width within a range of widths associated with the first stripe. In some embodiments, this may be associated a minimum acceptable gap width for the bag 5. If the user can see a second stripe (e.g., stripe 12) outside the first stripe, this may indicate that the bag (and thus the gap) has a width within a range of widths associated with the second stripe. In some embodiments, the user may note an outermost visible stripe (e.g., a stripe closest to cargo surfaces, in the Z-axis direction when inflated) and determine that the bag has a width within a range of widths associated with such outermost visible stripe. If such outermost visible stripe is inside of the stop stripe 16 on the bag 5, the user may conclude that the bag's width is safe. If all or a portion of the stop stripe 16 is visible, the user may conclude that the bag's width is not safe, and that the gap is too wide for the bag. The width of the gap may be decreased, or a larger bag may be required to properly support the cargo at the current width.

Figure 2:
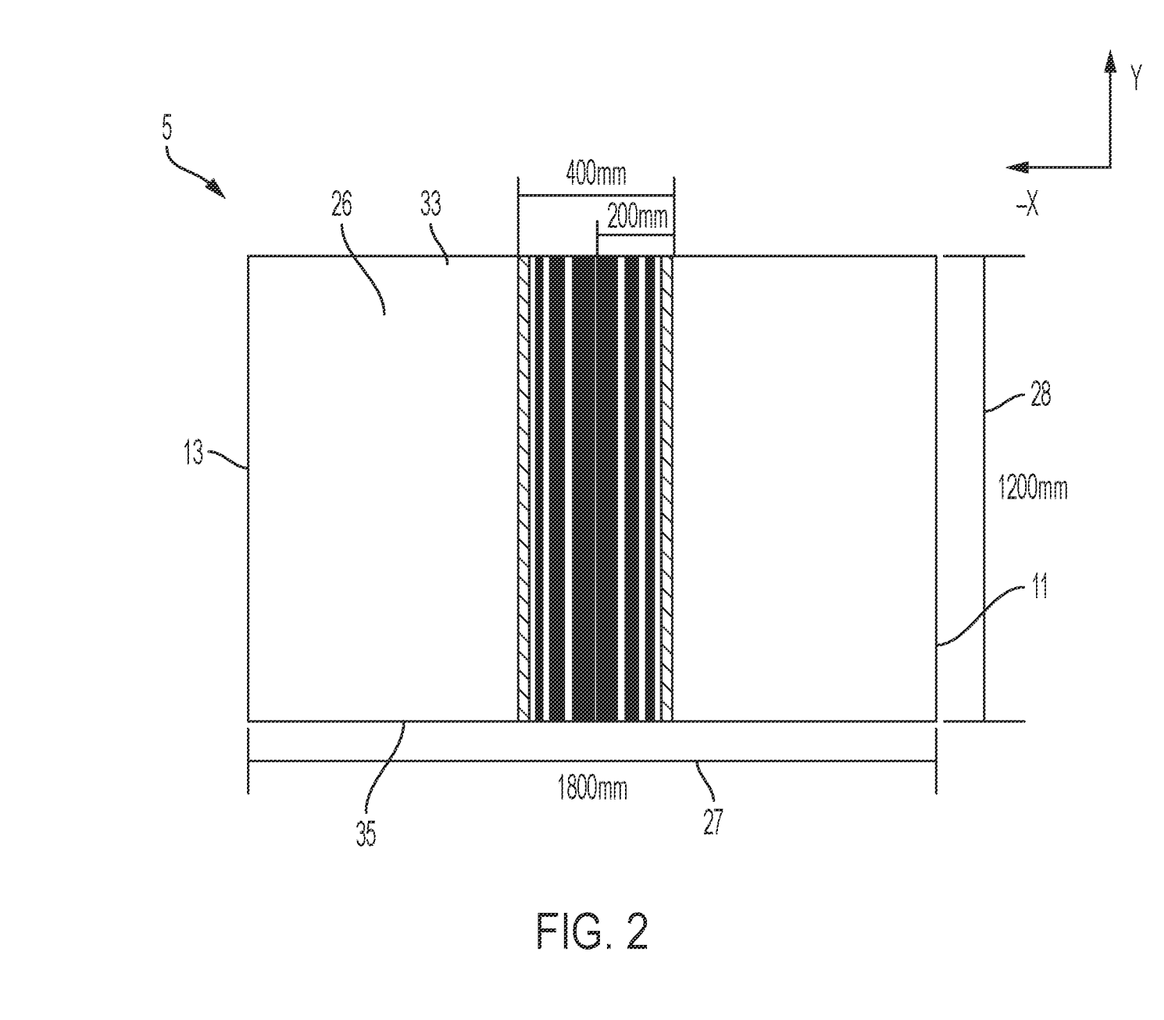
FIG. 2 is a view of sides of dunnage bag with graduated inflation stripes in accordance with some embodiments of the present disclosure.

Note that the stripes may also indicate an amount of the bag that is in contact with the adjacent cargo based on the number and width of stripes. If the employee sees a "stop" or "unsafe" indicator stripe is visible, the user may determine that the that the gap between cargo is too wide for the dunnage bag currently in use. If the user notes that the stop stripe is not visible, the user may determine that the that the gap between cargo is not too wide for the dunnage bag currently in use, and that an appropriate amount of surface area of the bag is in contact with the cargo. If the stop stripe is visible, however, the worker may determine that the gap is too wide for the current bag and an insufficient amount of the bag is in contact with the cargo. A stripe closest to the user may indicate a maximum surface area of the bag is in FIG. 2 is a front panoramic perspective view of a dunnage bag with graduated inflation stripes in accordance with some embodiments of the present disclosure. While FIG. 1 shows a "right" side of a bag 5, FIG. 2 shows the bag material flattened, before fabrication of the bag (e.g., joining of edges of the bag material to form seams). In some embodiments, as shown in FIG. 2, a bag 5 may have similar or identical markings on each of later side, 7 and side 26, which may have a rear end 13 which compliments end 11. The bag may have a height 28 of approximately 1200 mm (1.2 meters) and an overall width 27 of 1800 mm (1.8 meters).

The bag 5 may be fabricated from a single sheet of material (which may be referred to as a "substrate"), which may comprise vinyl acetate (CAS No. 803184) woven fibers, paper or fabric. The bag 5 may have one or more polyethylene bladder tubes inside the substrate (not specifically shown), which may be heat sealed. The substrate may be formed into a tube of paper or polypropylene or other manmade fibers and a bladder may be inserted before the substrate tube is sealed. In some embodiments, the bag 5 may be bladderless. The foregoing are merely examples of potential techniques for fabricating a bag 5 in accordance with some embodiments of the present disclosure.

While not specifically shown in the figures, in some embodiments, the bag 5 may be assembled by bonding, stitching, welding or otherwise attaching sides of the bag to one another to form seams and an enclosed volume. As an example, the bag may be folded to allow ends 11 and 13 to be attached to one another. Can be woven into a tube and bladder can be inserted and then bag can be sealed around bladder. Edges 8 and 9 of bag 5 may be formed by attaching the top edge 33 and bottom edge 35 of the bag 5 together to form a top seam (e.g., edge 8) and bottom seam 9 (e.g., edge 9) of the bag, respectively. The edges 8 and 9 may be attached using adhesive, welded together, stitched together, heat sealed together, bonded together, etc. Front edge 6 and rear edge 11 may be crimped to form a seam (see FIG. 3). Other techniques for assembling bag 5 may be used in other embodiments.

Figure 3:
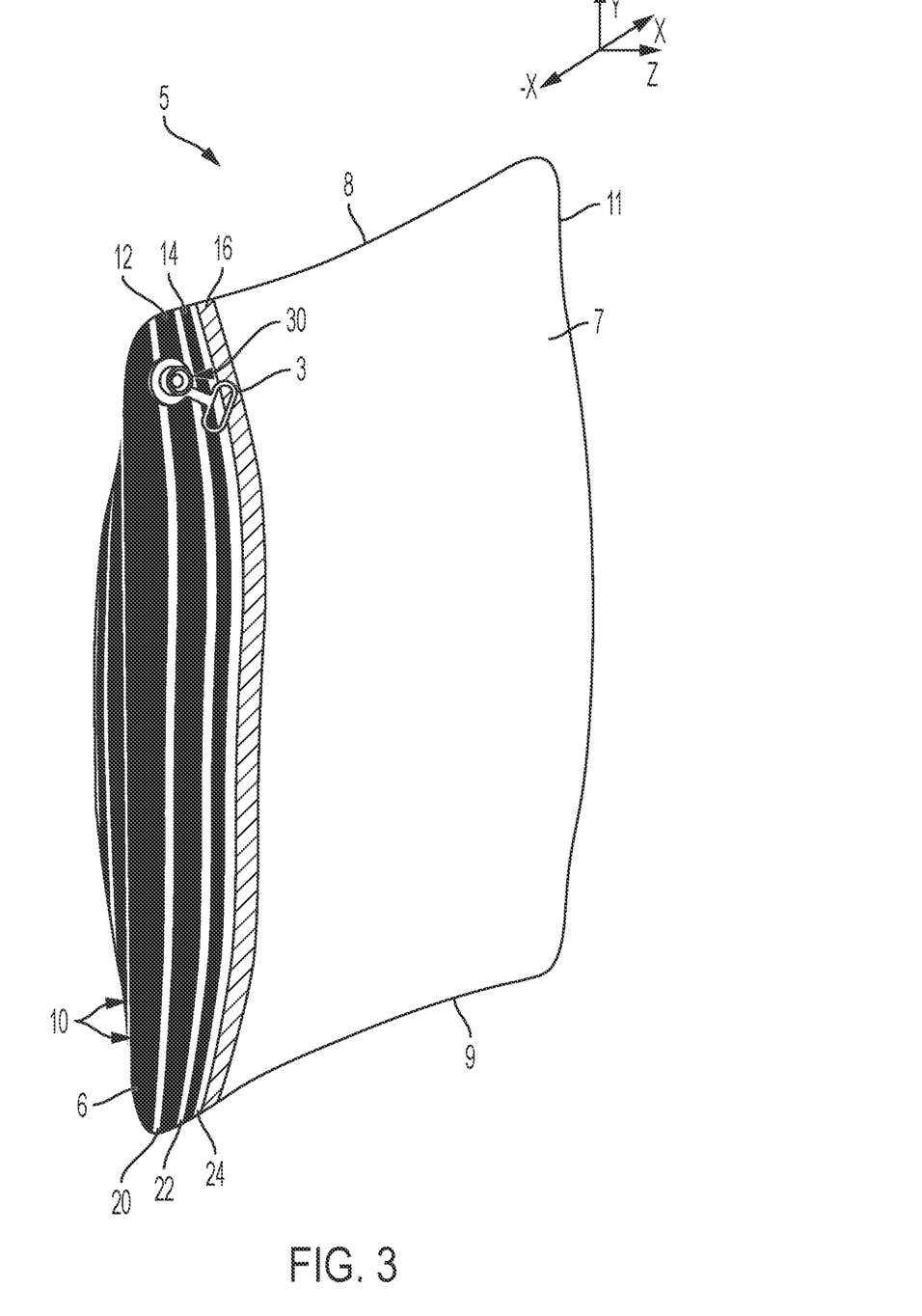
FIG. 3 is a three-dimensional perspective view of a partly inflated dunnage bag with graduated inflation stripes in accordance with some embodiments of the present disclosure.

FIG. 3 is a three-dimensional perspective view of a dunnage bag with graduated inflation stripes in accordance with some embodiments of the present disclosure. The view of FIG. 3 illustrates an inflated and assembled bag 5 as may be used to secure and support cargo. The exemplary bag 5 of FIG. 3 has a port 30 for allowing a pressurized fluid to pass into the interior volume of the bag 5. In some embodiments the port 30 may comprise a valve (not specifically shown), which can be a one-way valve configured to prevent fluid from escaping from the bag once inside the bag interior volume, although in some embodiments, the valve may have two-way functionality to allow fluid to leave the inner volume, such as by manually actuating the valve to reduce internal pressure. In some embodiments, the fluid may be air (e.g., CAS No. 132259-10-0), but in some embodiments, the bag may be inflated using other fluids in other embodiments.

The bag 5 also includes tab 32 for aiding a user in transporting the bag 5 or for assisting during inflation.

Figure 4:
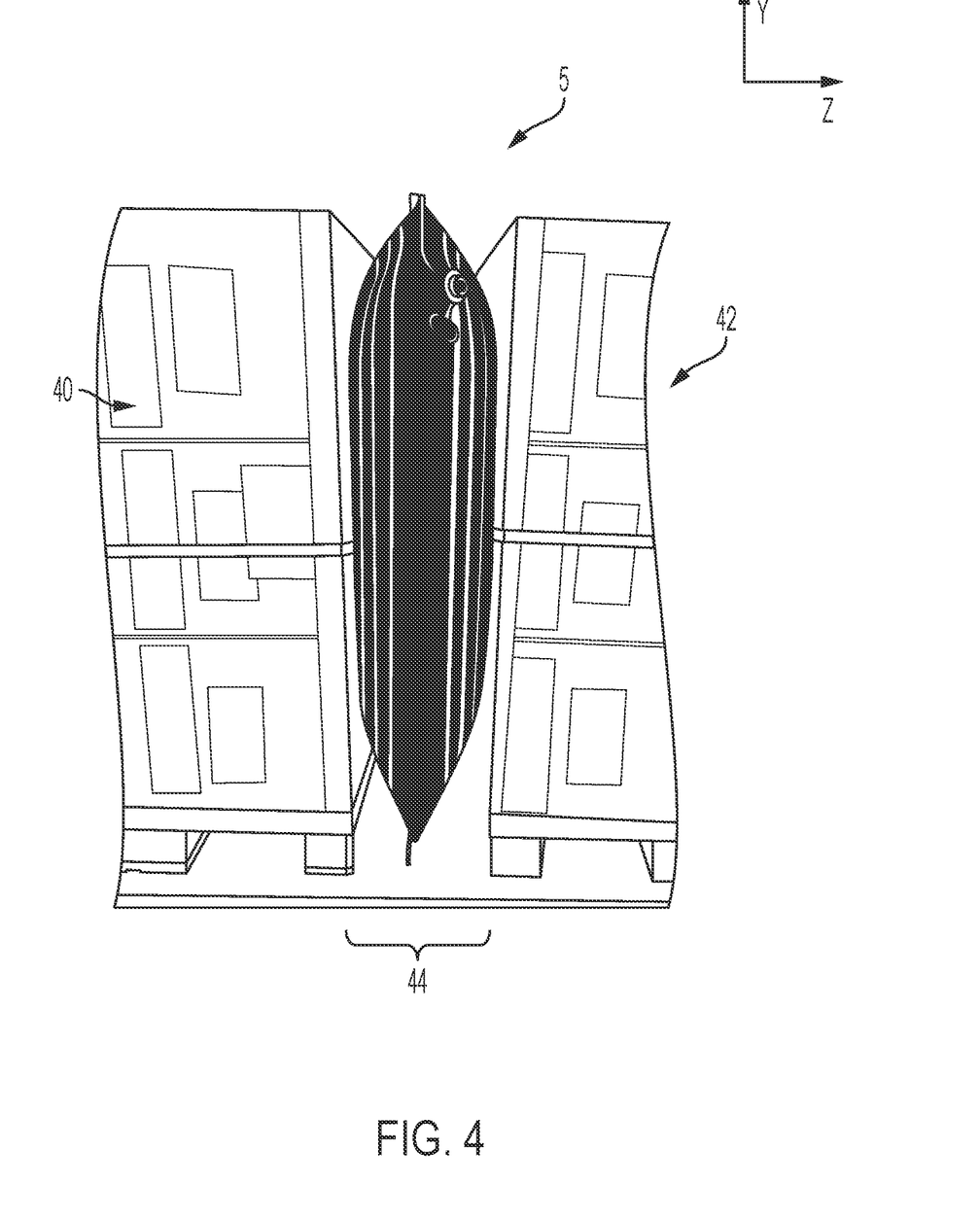
FIG. 4 is a front perspective view of a dunnage bag with graduated inflation stripes positioned between cargo in accordance with some embodiments of the present disclosure.
Figure 5:
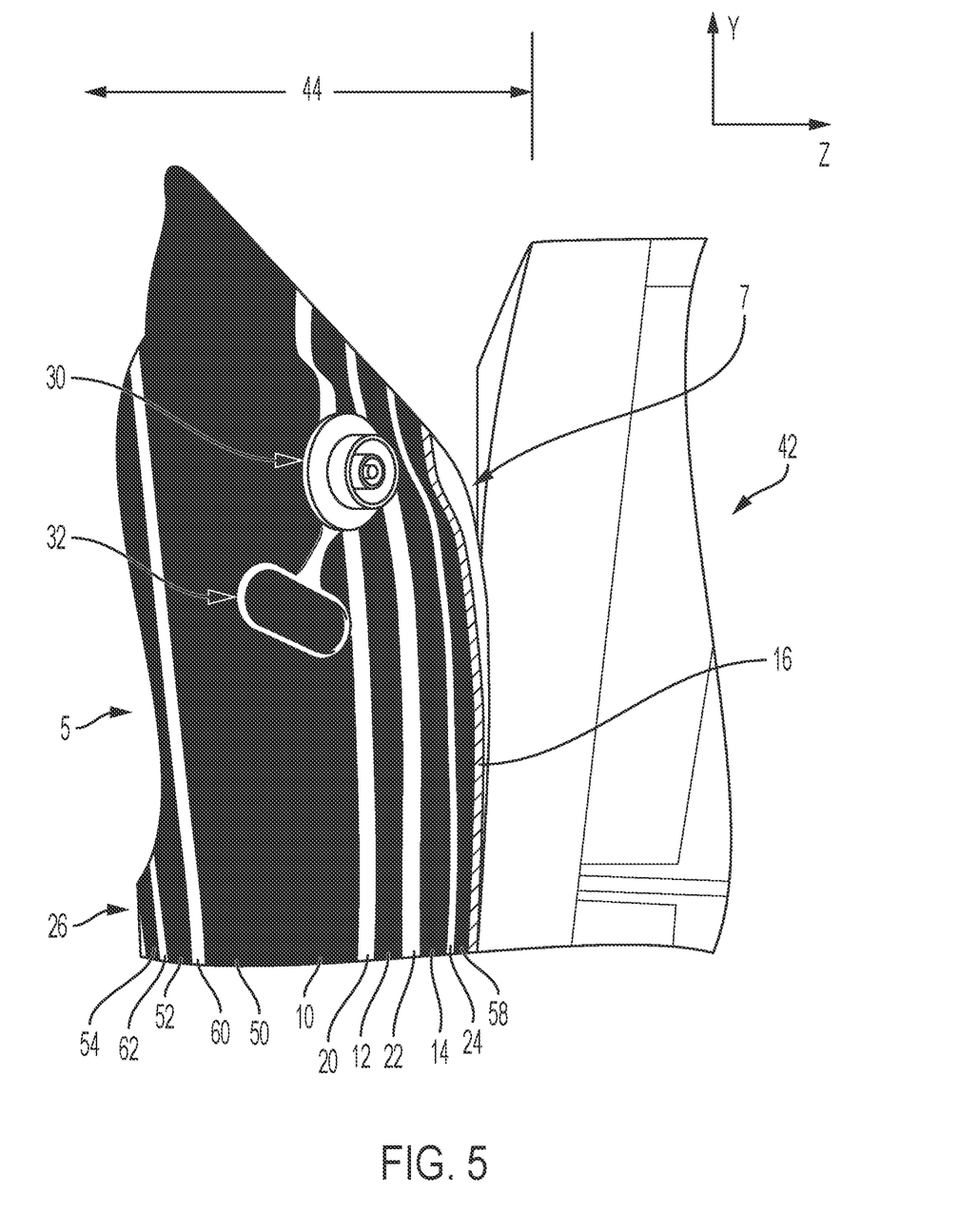
FIG. 5 is a detail front perspective view of a dunnage bag with graduated inflation stripes positioned between cargo in accordance with some embodiments of the present disclosure.

FIG. 4 is a front perspective view of a dunnage bag with graduated inflation stripes positioned between cargo, and FIG. 5 is a detail front perspective view of a dunnage bag with graduated inflation stripes positioned between cargo in accordance with some embodiments of the present disclosure.

The dunnage bag 5 has been inflated and positioned in a gap 44 between cargo 40 and 42. As noted above, stripes 10-16 have varying widths to indicate a current inflation capacity of the bag 5. The bag in FIGS. 4-9 have additional stripes 54 and 58 adjacent to stripe 16. Such stripes adjacent to the stop stripe 16 may be referred to as "warning" stripes which can include coloring, symbols, lettering, or combinations thereof (e.g., yellow coloring or triangular symbols, or lettering indicating a warning) to warn a user that pressure within the bag is approaching an unsafe width. The bag 5 also has gaps 20, 22, 24 on right side 7 between stripes 10, 12, 14 and 58 respectively, and gaps 60, 62 on left side 26 between stripes 50, 52, and 54 respectively.

As seen in FIGS. 3 and 4, stripes on the front end 6 of the bag 5 may be visible when positioned between adjacent cargo 40 and 42. In the embodiment of FIGS. 4 and 5, the bag 5 is positioned in gap 44 between cargo 40 and 42. A plurality of inflation stripes of the bag 5 are visible, including: stripes 10, 12, 14 and 58 on right side 7 and stripes 50, 52, and 54 on left side 26. The "stop" stripe 16 of the bag 5 is depicted in FIG. 4 as not clearly visible. This indicates that the selected bag 5 has a sufficient size and inflation capacity for use in gap 70 to properly support cargo 40 and 42 at a safe width.

However, the detail view of FIG. 5 reveals that a small portion of stripe 16 is visible. The visibility of stripe 16 indicates that the bag is too wide (e.g., because a portion of stripe 16 is visible). A user may decrease width of gap 44 until stripe 16 is no longer visible or may substitute the bag 5 for a larger size bag. In some embodiments, the user may test the bag 5 within gap 44 to ensure that the bag 5 is at an appropriate width to remain in contact with sides of the cargo 40, 42 and properly support the cargo 40, 42. If the bag 5 no longer has sufficient pressure to properly support the cargo 40, 42, a different bag 5 with appropriate dimensions for use in gap 44 may be provided.

Figure 6:
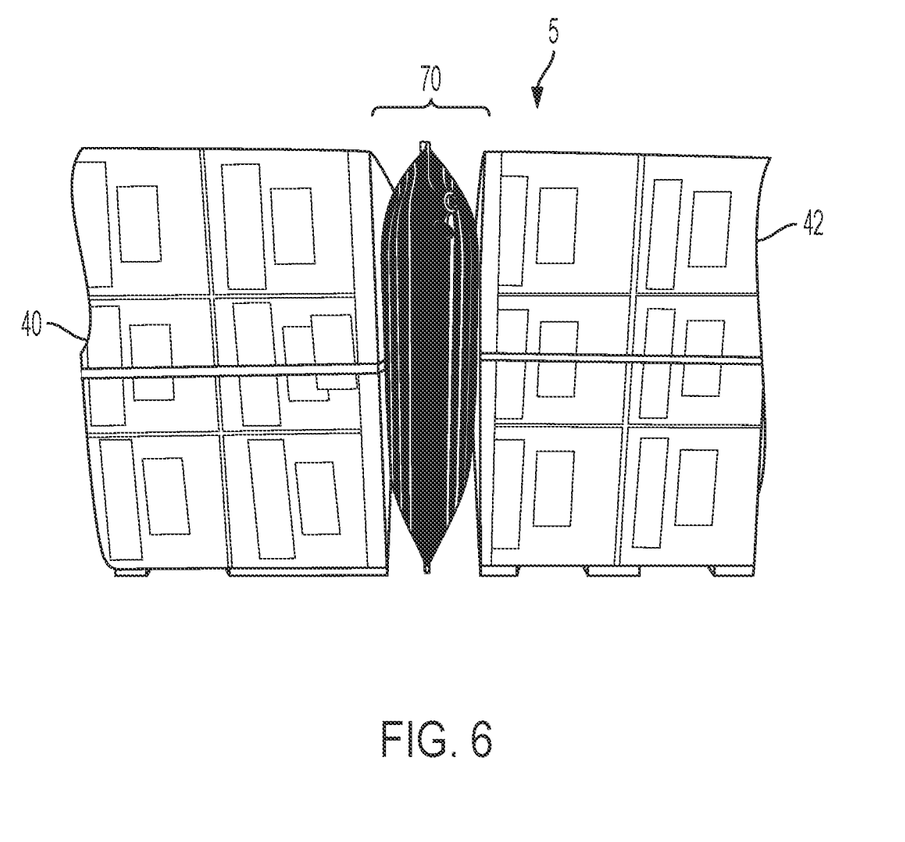
FIG. 6 is an additional front perspective view of a dunnage bag with graduated inflation stripes positioned between cargo in accordance with some embodiments of the present disclosure.

FIG. 6 is an additional front perspective view of a dunnage bag with graduated inflation stripes positioned between cargo in accordance with some embodiments of the present disclosure. The bag 5 has inflation stripes as in earlier figures, but which are not specifically labeled. In the embodiment of FIG. 6, the bag 5 is positioned in gap 70 between cargo 40 and 42. A plurality of inflation stripes of the bag 5 are visible. However, the "stop" stripe of the bag 5 is not visible. This indicates that the selected bag 5 has a sufficient size for use in gap 70 to properly support cargo 40 and 42 at a safe width.

Figure 7:
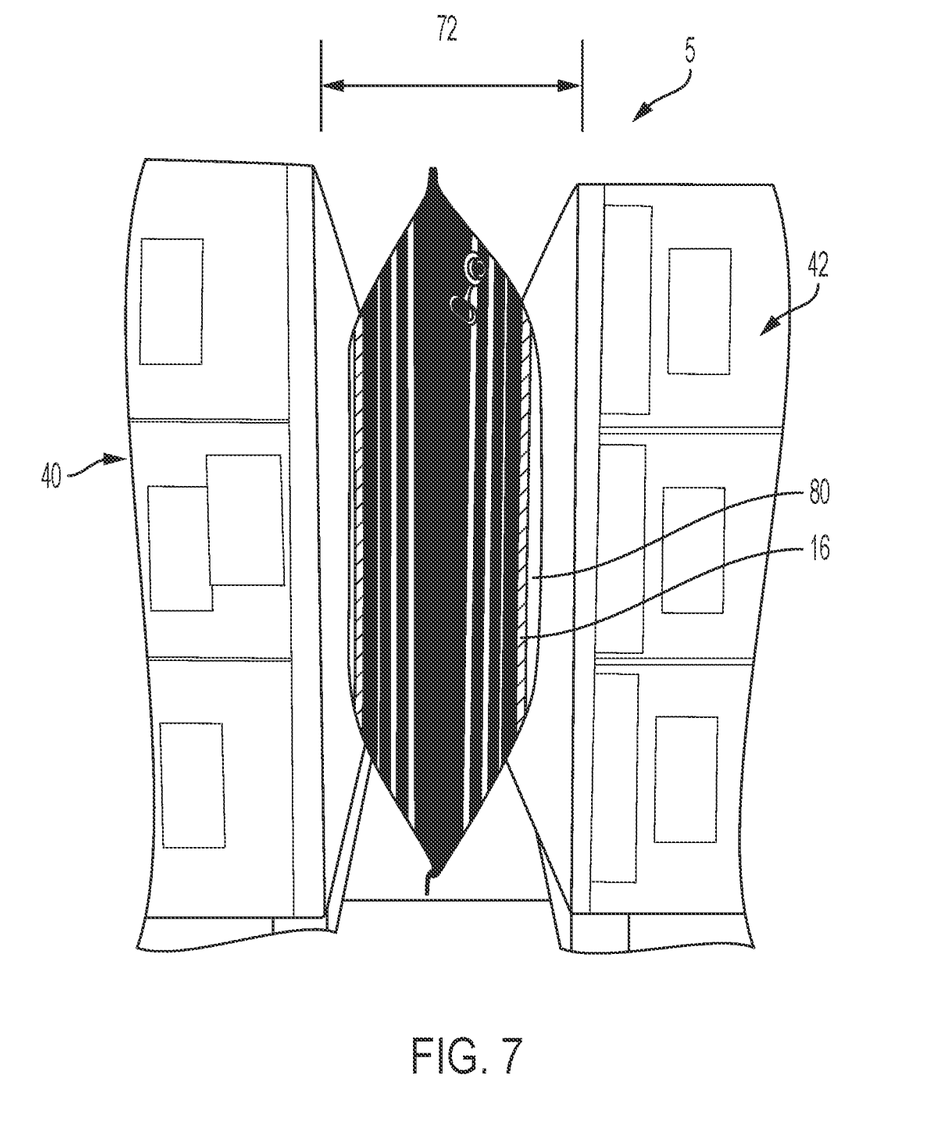
FIG. 7 is an additional front perspective view of a dunnage bag with graduated inflation stripes positioned between cargo in accordance with some embodiments of the present disclosure.
Figure 8:
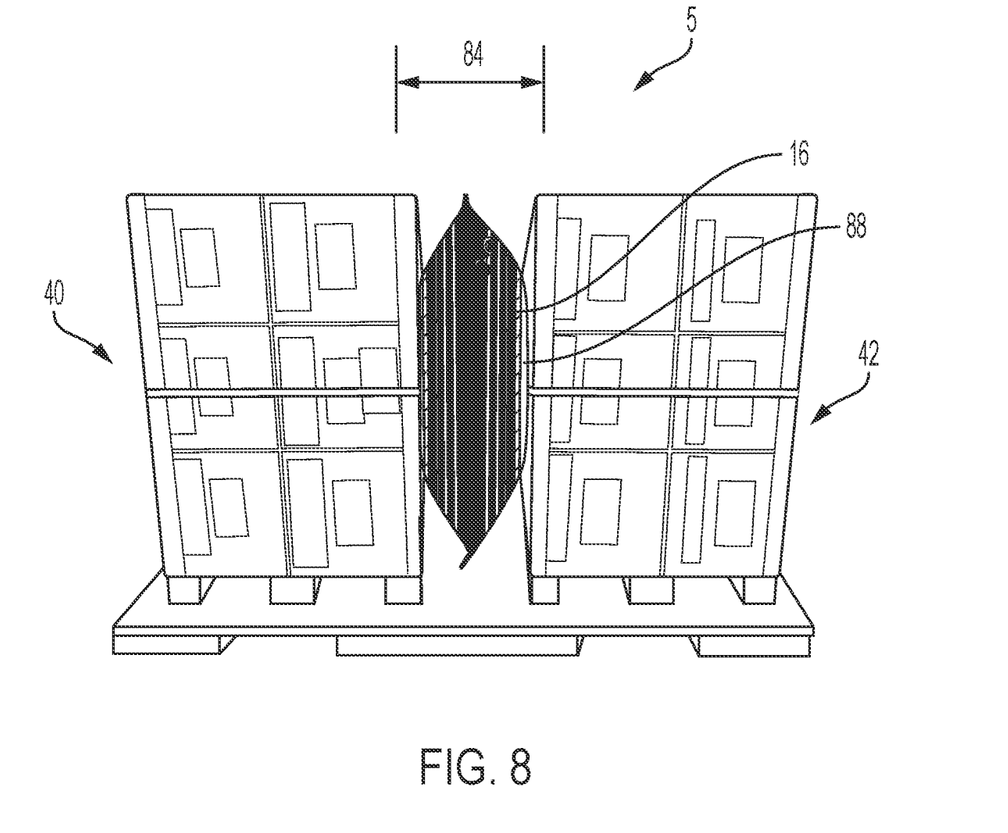
FIG. 8 is an additional front perspective view of a dunnage bag with graduated inflation stripes positioned between cargo in accordance with some embodiments of the present disclosure.

FIG. 7 is a front perspective view of a dunnage bag with graduated inflation stripes positioned between cargo, and FIG. 8 is an additional front perspective view of a dunnage bag with graduated inflation stripes positioned between cargo in accordance with some embodiments of the present disclosure.

Again, the bag 5 has inflation stripes as in earlier figures, but which are not specifically labeled. In the embodiment of FIGS. 7 and 8, the bag 5 is positioned in gap 72 between cargo 40 and 42. A plurality of inflation stripes of the bag 5 are visible, as well as the "stop" stripe of the bag 5, and the portion of the bag that is located behind the stop stripe (as viewed from the perspective of FIGS. 7 and 8). This indicates that the selected bag 5 does not have a sufficient size (capacity or width) for use in gap 72 to properly support cargo 40 and 42 at a safe width. Either the cargo 40 and 42 must be positioned closer to one another to decrease width of gap 72 or a different dunnage bag must be used that has a size and capacity appropriate for use in gap 72 at a safe inflation width. Similarly, the bag 5 in FIG. 8 does not have sufficient width for gap 84 because stop stripe 16 is completely visible, as is a portion 88 of the bag beyond the stop stripe 16.

Figure 9:
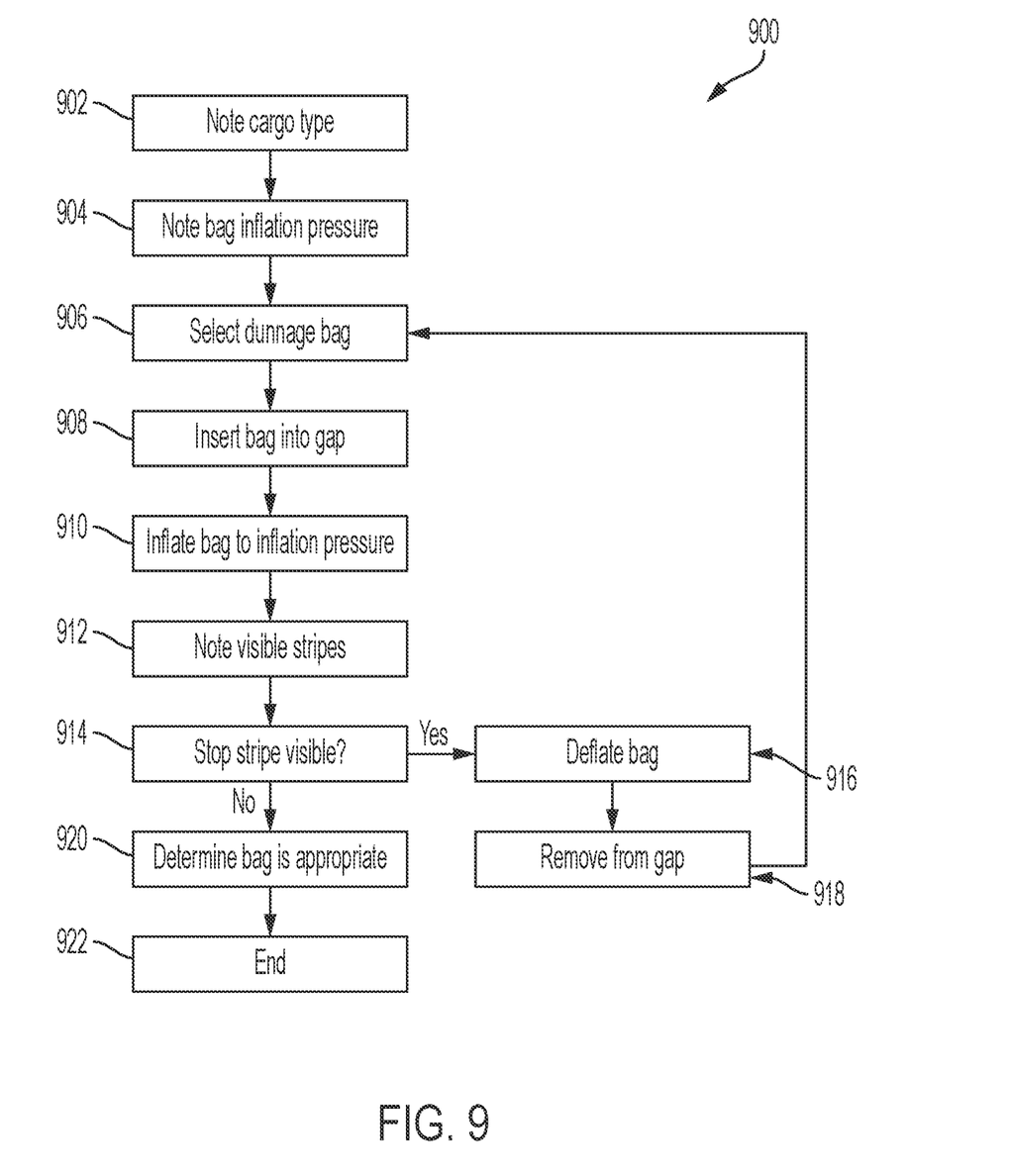
FIG. 9 is a flowchart depicting a method 900 for using a dunnage bag with graduated inflation stripes positioned between cargo in accordance with some embodiments of the present disclosure.

FIG. 9 is a flowchart depicting a method 900 for using a dunnage bag with graduated inflation stripes positioned between cargo in accordance with some embodiments of the present disclosure.

At step 902, a user may note cargo type on adjacent sides of gap. The user may reference a manifest or other repository of cargo information, or may use information on the cargo itself to determine cargo types. Thereafter the user may proceed to step 904.

At step 904, the user may note bag inflation pressure based on cargo type. The user may reference a listing of pressures associated with cargo types or one or more applicable regulations. Thereafter, the user may proceed to step 906.

At step 906, the user may select a dunnage bag. The user may select the bag based the reference a listing of pressures associated with cargo types or the one or more applicable regulations. Thereafter, the user may proceed to step 908.

At step 908, the user may insert bag into gap. The user may place the bag into the gap between the cargo. Thereafter, processing may proceed to step 910, where the user may inflate bag to the indicated inflation pressure. This may be done using a pressure tool which may be metered to pressurize the bag to the desired pressure. Thereafter, the user may proceed to step 912.

At step 912, the user may note visible stripes on bag and at step 914, the user may determine whether stop stripe is visible. If the user sees the stop stripe, the user may proceed to step 916, where the user may deflate bag before the user removes the bag from the gap at step 918. Thereafter, the user may return to step 906.

If the user does not see the stop stripe, processing may proceed to, step 920. At step 920, the user may determine that the bag is the appropriate width for the gap, and at step 922, processing may end.

It is to be understood that any given elements of the disclosed embodiments of the invention may be embodied in a single structure, a single step, a single substance, or the like.

Similarly, a given element of the disclosed embodiment may be embodied in multiple structures, steps, substances, or the like.

The foregoing description illustrates and describes the processes, machines, manufactures, compositions of matter, and other teachings of the present disclosure. Additionally, the disclosure shows and describes only certain embodiments of the processes, machines, manufactures, compositions of matter, and other teachings disclosed, but, as mentioned above, it is to be understood that the teachings of the present disclosure are capable of use in various other combinations, modifications, and environments and is capable of changes or modifications within the scope of the teachings as expressed herein, commensurate with the skill and/or knowledge of a person having ordinary skill in the relevant art. The embodiments described hereinabove are further intended to explain certain best modes known of practicing the processes, machines, manufactures, compositions of matter, and other teachings of the present disclosure and to enable others skilled in the art to utilize the teachings of the present disclosure in such, or other, embodiments and with the various modifications required by the particular applications or uses. Accordingly, the processes, machines, manufactures, compositions of matter, and other teachings of the present disclosure are not intended to limit the exact embodiments and examples disclosed herein. Any section headings herein are provided only for consistency with the suggestions of 37 C.F.R. § 1.77 or otherwise to provide organizational queues. These headings shall not limit or characterize the invention(s) set forth herein.

What is claimed is:

1. A dunnage bag 5, comprising:
   a first stripe 14 on a surface 7 of the dunnage bag, wherein the first stripe extends from a first edge 8 of the surface 7 to a second edge 9 of the surface, wherein the first stripe 10 is visible when the dunnage bag 5 is viewed in position between adjacent surfaces 40, 42 and inflated to a first internal pressure, wherein a visible portion of the first stripe 10 varies based on width of the dunnage bag with regard to a gap within which the bag is inserted, and wherein an amount of a width of the first stripe 10 that is visible is indicative of a remaining safe inflation width between adjacent surfaces 40, 42; and
   a second stripe 16 on the surface 7, wherein the second stripe extends from the first edge 8 to the second edge 9, wherein the second stripe is visible when the dunnage bag is viewed in position between adjacent surfaces and inflated to a second internal pressure, wherein a visible portion of the second stripe varies based width of the dunnage bag with regard a gap within which the bag is inserted, and wherein an amount of a width of the second stripe that is visible is indicative of an amount by which the second internal pressure has exceeded the safe inflation width.

2. The dunnage bag of claim 1, wherein, the first stripe has a first color, and the second stripe has a second color different from the first color.

3. The dunnage bag of claim 1, further comprising:
   a third stripe on a surface of the dunnage bag, wherein the third stripe extends from the first edge to the second edge, wherein the third stripe is visible when the dunnage bag is viewed in position between the adjacent surfaces and inflated to a third internal pressure, wherein a visible portion of a of the third stripe that is visible varies based on width of the dunnage bag with regard the gap within which the bag is inserted, and wherein an amount of a width of the third stripe that is visible is indicative of a safe inflation width of the dunnage bag remaining until the first stripe is visible.

4. The dunnage bag of claim 3, wherein entire widths of the third stripe and the first stripe are visible if any portion of the second stripe is visible.

5. The dunnage bag of claim 1, wherein a width of the first stripe is less than a width of the second stripe.

6. The dunnage bag of claim 3, wherein a width of the third stripe is at least as great as a width of the second stripe.

7. A method for indicating inflation of a dunnage bag relative to a safe inflation capacity, comprising:
   providing a first stripe 14 on a surface 7 of the dunnage bag, wherein the first stripe extends from a first edge 8 of the surface 7 to a second edge 9 of the surface, wherein the first stripe 10 is visible when the dunnage bag 5 is viewed in position between adjacent surfaces 40, 42 and inflated to a first internal pressure, wherein a visible portion of the first stripe 10 varies based on width of the dunnage bag with regard a gap within which the bag is inserted, and wherein an amount of a width of the first stripe 10 that is visible is indicative of a remaining safe inflation width of the dunnage bag; and
   providing a second stripe 16 on the surface 7, wherein the second stripe extends from the first edge 8 to the second edge 9, wherein the second stripe is visible when the dunnage bag is viewed in position between adjacent surfaces and inflated to a second internal pressure, wherein a visible portion of the second stripe varies based on width of the dunnage bag with regard the gap within which the bag is inserted, and wherein a visible portion of the second stripe that is visible is indicative of an amount by which the second internal pressure has exceeded the safe inflation width of the dunnage bag.

8. The method of claim 7, wherein, the first stripe has a first color, and the second stripe has a second color different from the first color.

9. The method of claim 7, further comprising:
   a third stripe on a surface of the dunnage bag, wherein the third stripe extends from the first edge to the second edge, wherein the third stripe is visible when the dunnage bag is viewed in position between the adjacent surfaces and inflated to a third internal pressure, wherein a visible portion of the third stripe that is visible varies based on width of the dunnage bag with regard the gap within which the bag is inserted, and wherein an amount of a visible portion of of the third stripe that is visible is indicative of remaining width of the dunnage bag remaining until the first stripe is visible.

10. The method of claim 9, wherein entire width of the third stripe and the first stripe are visible if any portion of the second stripe is visible.

11. The method of claim 7, wherein a width of the first stripe is less than a width of the second stripe.

12. The method of claim 9, wherein a width of the third stripe is at least as great as a width of the second stripe.

* * * * *